United States Patent [19]

Heath et al.

[11] 4,308,307

[45] Dec. 29, 1981

[54] PLASTIC PANEL FOR VEHICULAR EXTERIOR

[75] Inventors: Gerald A. Heath, Canton Township, Plymouth County; Donald J. Ray, Plymouth; Kenneth H. Woodrich, Rochester, all of Mich.

[73] Assignee: Ford Motor Company, Dearborn, Mich.

[21] Appl. No.: 117,714

[22] Filed: Feb. 1, 1980

[51] Int. Cl.³ ............................................. B32B 3/00
[52] U.S. Cl. ................................ 428/167; 180/69 R; 296/35.2
[58] Field of Search .......................... 180/69 R, 69 C; 296/35.2; 428/167–168, 31

[56] References Cited

U.S. PATENT DOCUMENTS

| | | | |
|---|---|---|---|
| 3,449,482 | 6/1969 | Mitchell et al. | 156/245 X |
| 3,507,730 | 4/1970 | Gambill et al. | 156/245 X |
| 3,903,343 | 9/1975 | Pfaff | 428/168 |

Primary Examiner—Henry F. Epstein
Attorney, Agent, or Firm—Peter D. McDermott; Roger L. May

[57] ABSTRACT

A panel suitable for use as an engine compartment closure panel provides improved function and surface finish and buckles forward of its rearward edge across its width upon impact at its forward edge. The panel has a smooth outer surface and an inner surface bearing integrally formed reinforcing members. The inner surface and reinforcing members have definition comprising A. opposing first and second rib patterns comprising ribs diagonally extending sufficiently across the inner surface so as to intersect one another between the forward and rearward edges and provide torsional rigidity to the panel;

B. a medial rib pattern comprising a rib that extends across the width of the inner surface;

C. a rearward rib pattern comprising a rib that extends from the medial rib pattern to the rearward edge; and D. a panel weakening pattern that enables buckling of the panel along a line adjacent to the medial rib pattern and comprising:
 1. reduced thickness of the plate forward of the medial rib pattern; and
 2. discontinuities in ribs of the first and second rib patterns at the medial rib pattern.

23 Claims, 8 Drawing Figures

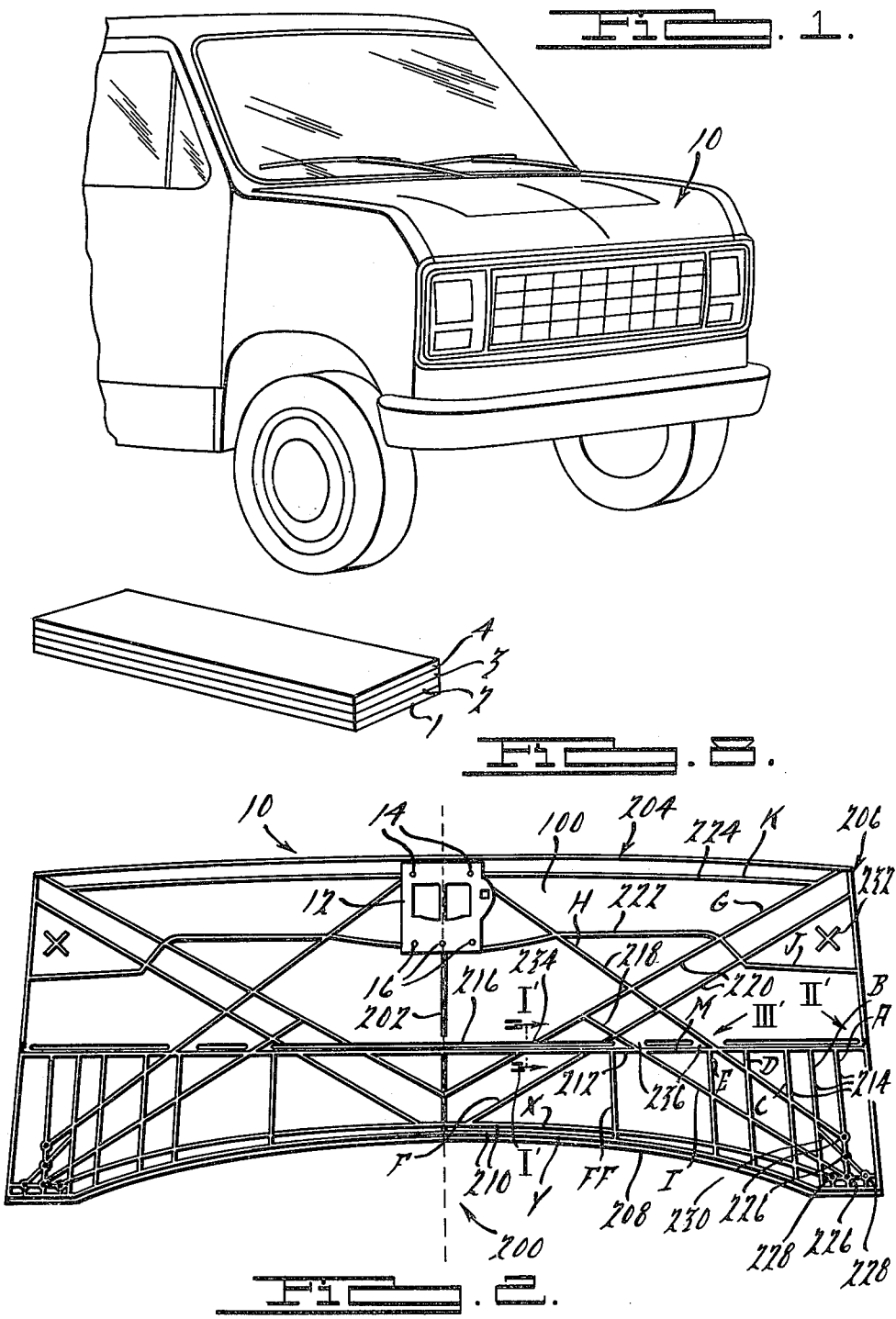

PLASTIC PANEL FOR VEHICULAR EXTERIOR

BACKGROUND OF THE INVENTION

A long standing problem with respect to compression molding of fiber-containing thermosetting resin has been surface finish of large structural articles. A particularly difficult problem with respect to production of such articles has been removal of surface irregularities commonly referred to as "sink."

U.S. Pat. No. 3,903,343 relates to sink reduction by molding a compound comprising long and short fibers. The short fibers flow into ribs. The weight ratio of short to long fibers is greater than one.

The article "Sink Reduction Techniques for SMC Molding" by Amplthor (33rd Annual Technical Conference, 1978, Reinforced Plastic/Composites Institute, The Society of Plastics Industry, Inc.) describes how certain parameters affect sink. The article illustrates a dual pressure molding cycle as a means to reduce sink. Also, the article describes other parameters that may reduce sink.

The article "SMC-Sink Mechanisms and Techniques of Minimizing Sink" (Jutte, (paper 730171) SAE, Jan. 12, 1973) also describes a variety of parameters including rib design, that may reduce sink.

SUMMARY OF THE INVENTION

This invention relates to plastic structures made by techniques such as compression molding. More particularly, the invention relates to the art of making such structures in an industrially suitable manner and so as to achieve an improvement in surface finish and function. Still more particularly, the invention relates to an interplay of factors such as design, process and material that give such improvement.

This invention relates especially to a panel that is a plastic closure panel and which buckles forward of its rearward edge across its width on an impact that is at its forward edge, said closure panel comprising a plate having a smooth, outer surface and an inner surface bearing integrally formed reinforcing members, said inner surface and reinforcing members having definition comprising:

A. opposing first and second rib patterns comprising ribs diagonally extending sufficiently across said inner surface so as to intersect one another between said forward and rearward edges and provide torsional rigidity to said panel;

B. a medial rib pattern comprising a rib that extends along a width of said inner surface;

C. a rearward rib pattern comprising a rib that extends from said medial rib pattern to said rearward edge;

D. a panel weakening pattern that enables buckling of said panel along a line adjacent to said medial rib pattern and comprising;

1. a reduced thickness (e.g., a groove) of said plate forward of said media rib pattern;

2. discontinuites in ribs of said first and second rib patterns at said medial rib pattern.

BRIEF DESCRIPTION OF THE DRAWINGS

FIG. 1 shows an external body panel, i.e., engine compartment closure panel 10, made in accordance with this invention.

FIG. 2 shows the underside of panel 10 of FIG. 1.

FIG. 8 shows a preferred charge pattern that is compression molded to yield a panel in accordance with this invention.

DETAILED DESCRIPTION OF PREFERRED EMBODIMENTS

Figure 3:
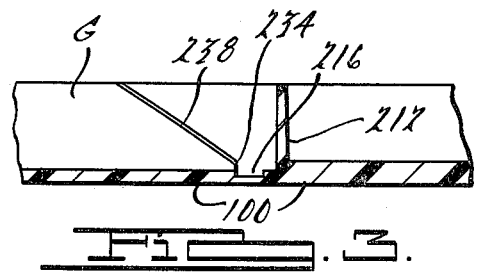
FIG. 3 is a section taken around I'—I' of FIG. 2.

Panels of this invention may be made of thermoplastic or thermosetting or thermosetting and thermoplastic resin by any of numerous molding techniques. A preferred technique is compression molding and especially compression molding of thermosetting resin. An especially preferred compression molding technique is a method for producing a compression molded fiber reinforced plastic closure panel comprising a plate having an outer surface and an inner surface bearing integrally molded reinforcing members. The method comprises:

A. providing a mold with heated first and second mold members that close to form a configuration for said panel, one of said mold members having a surface interrupted by rib-forming chambers that fill to form a rib pattern that rigidifies said panel, said chambers having a width about equal to or less than the thickness of said plate and a depth at least as large as said thickness; B. introducing molding compound between said mold member in sufficient amount to form under heat and pressure said panel, said molding compound being in layers positioned one atop another, a first part of said layers comprising thermosetting resin and relatively short chopped fibers and the other part comprising thermosetting resin and relatively long chopped fibers; C. causing said mold members to close upn said molding compound at a pressure in a relative high range so as to cause flow of said molding compound between said mold members into said configuration whereby said relatively short fibers flow into said chambers; D. reducing said pressure to a subsequent pressure in a relatively low range and permitting said molding compound to at least substantially cure at a pressure in said relatively low range; E. parting said mold members; F. removing said panel from between said mold members.

FIGS. 1-7 illustrate an embodiment of this panel; other integrally reinforced panels may also be made in accordance with this invention.

As shown in FIG. 1, panel 10 fits on what is termed a "van". The embodiment of FIG. 1 has advantage vis-a-vis sink identification. That is, relative to engine compartment closure panels of other vehicles, it has (1) greater curvature relative to flat areas and (2) passenger sight lines that are much greater than 0°. Principles of this invention, however, are not limited to an application as in FIG. 1; rather, FIG. 1 is a current optimal application of principles of this invention.

FIG. 2 shows the underside of panel 10. With the exception of latch 12 and associated fastening means therefor 14 and 16, panel 10 has a composition of fiber reinforced plastic. Reinforced plastic, however, may replace metal latch 12, if further weight reduction is desired.

Panel 10 comprises plate 100 with integrally molded reinforcing members as hereinafter particularly described. Since panel 10 is symetrically reinforced on either side of center 200 through center rib 202, right integral reinforcing members shall be particularly described hereinafter.

Panel 10 is affixed to the van through hinge means located at its rearward most right and left corners. The right hinge means (not shown) is mounted by bolts or other affixing means that extend from bosses 226. The bolts are added to bosses 226 after molding.

Latch plate 12 engages a latch mounted to the body of the van to lock it in position after closure. Small X-shaped rib pattern 232 supports a front part of panel 10 when it is in its closed position on the van.

Respective forward and side edge ribs 204 and 206 project from the underside of plate 100 at its outermost periphery. Rear periphery edge 208 of plate 100 is free of edge ribs. Rather, rearward most rib pattern 210 rigidifies a rear portion of panel 100. Rib pattern 210 comprises respective forward and rear ribs X and Y that extend from center rib 202 to side edge rib 206.

Forward of rearward most rib pattern 210 is medial rib pattern 212. Medial rib pattern 212 comprises rib M that intersects with center rib 202 and side edge rib 206.

Rearward rib pattern 214 extends between medial rib 212 and rearward most rib pattern 210. Rearward rib pattern 214 comprises ribs A,B,C,D,E and FF. Rearward rib pattern 214 resists bending of panel 100 around an axis extending between center rib 202 and side edge rib 206.

Center-corner and corner-center rib patterns 220 and 218 comprise, respectively, ribs F and G and ribs H and I. Center-corner and corner-center rib patterns 220 and 218, respectively, along with their corresponding left rib patterns, form, respectively, V-shaped and inverted V-shaped patterns as shown. The V-and inverted V-shaped patterns provide torsional resistance to panel 10. For example, these patterns resist bending of panel 10 from its planar surface, when three corners are fixed. Additionally, the rearward portions (of center-corner and corner-center rib patterns 218 and 220) between medial rib pattern 212 and rearward most rib pattern 214 provide a bending resistance about an axis extending between center rib 202 and side edge rib 206.

Contour rib pattern 222 comprises contour rib J that extends on the underside of a contour of panel 100. Contour rib J rigidifies a forward portion of panel 100 and extends from underneath latch 12 at center rib 202 to side edge rib 206. Contour rib J is integral with three rear latch plate bosses under plate 12. These rear latch plate bosses accept fastening means 16 that affix a rear portion of latch plate 12 to panel 10. In this way, latch plate 12 is mounted on integrally molded contour rib J and rear latch plate bosses.

Forward most rib pattern 224 provides additional rigidity to panel 10 near its forward edge. Forward rib pattern 224 comprises forward rib K that extends from underneath latch 12 to a forward rib G of corner-center rib pattern 220. Forward rib G is integral with two forward latch plate bosses under plate 12. These forward latch plate bosses accept fastening means 14 that affix a forward portion of latch plate 12 to panel 10. In this way, latch plate 12 is mounted on integrally molded forward rib G and forward latch plate bosses.

Boss pattern 226 accepts fastening means such as bolts that project from the interior of individual bosses and accept hinge means (not shown) for panel 10. Boss pattern 228 accepts additional bolts or other fastening means. These additional bolts affix a hinge support plate (not shown) to panel 10. The hinge support plate provides additional, lateral support for the hinge means.

Flow ribs such as 230 extend from individual bosses to surrounding ribs. Flow rib 230 along with other integral ribs assist material flow during molding. Such material flow enables more complete filling of bosses in patterns 226 and 228.

Groove 216 extends a width of panel 10 between center rib 202 and side edge rib 206. Groove 216 may be made, for example, by routing plate 100 after molding of panel 10. Groove 216 weakens panel 100 along and forward of medial rib 212. Upon a frontal impact to the van shown in FIG. 1, panel 10 buckles at groove 216 whereby the part of panel 10 that includes medial rib 212 and portions rearward thereof buckles or otherwise breaks away from the part of forward thereof.

Discontinuity (such as at 234) and other strength disablements of reinforcing members on panel 10 further assist buckling. Conversely, groove discontinuities in groove 216 such as at 236 in FIG. 2 maintain a degree of strength in panel 10 along groove 216. The effect of groove discontinuity is mitigated, however, by a reduction of rib depth at such discontinuity. The nature of such discontinuity and other integrally molded strength modifications to panel 10 may be better seen in FIGS. 3, 4 and 5 as hereinafter described in greater detail.

More particularly, FIG. 3 shows a portion of rib G of corner-center rib pattern 220. This portion is adjacent groove 216 which, in turn, is adjacent medial rib 212.

Groove 216, as mentioned, weakens plate 100 by reducing its cross-sectional area. On the side of medial rib 212 away from groove 216, plate 100 has a thicker cross-section. This thicker cross-section strengths plate 100 rearward at medial rib 212. Rib G has taper 238 that decreases depth of rib G proportional to its distance from groove 216. Taper 238 in rib G prevents resistance by rib G to complete breakaway of forward and rear sections of panel 10.

Figure 4:
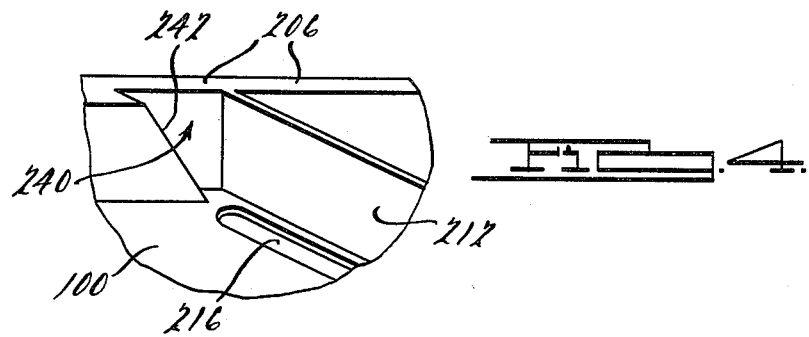
FIGS. 4 and 5 are perspectives along II' and III', respectively of FIG. 2.

FIG. 4 shows, in perspective, a section looking in along II' of FIG. 2. FIG. 4 shows notch 240 taken out of side edge rib 206. Notch 240 weakens side edge rib 206. Taper 242 in notch 240 in side edge rib 206 prevents resistance to complete breakaway of forward and rear sections of panel 10.

Figure 5:
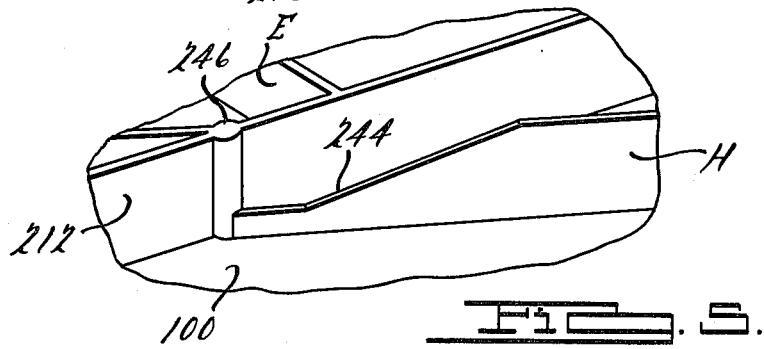

FIG. 5 shows in perspective a section looking in along III' of FIG. 2 to show relative disablement of rib H of rib pattern 218 as rib H approaches medial rib 212. Taper 244 in rib H provides such relative disablement but also retains a degree of strengthening across medial rib 212.

Shown, also, in FIG. 5 is ejector boss 246. Ejector boss 246 as well as other ejector bosses (not shown) distributed at rib intersections throughout panel 10 enable removal (by ejector pins) of panel 10 after it has cured in a mold.

Figure 6:
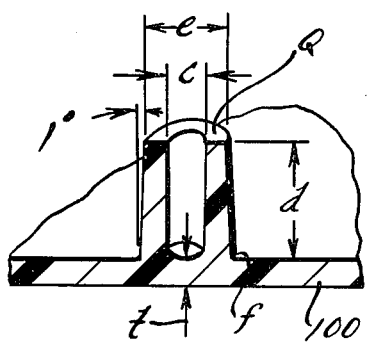
FIGS. 6 and 7 show dimensional characteristics of plate, ribs and bosses of panel 10.
Figure 7:
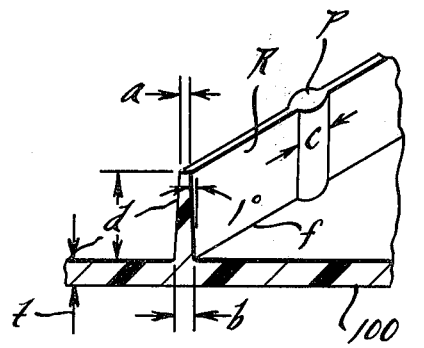

FIGS. 6 and 7 illustrate relative dimensions of ribs, bosses and plate that are preferably employed in panel 10 hereinbefore described in detail. These dimensions have reduced susceptibility of panel 10 to show sink after compression molding.

Depth d of rib R is considerably greater than thickness t of panel 100, e.g., 3 or more times as great. Similarly, depth d of boss B is considerably greater than thickness t of plate 100, e.g., 3 or more times as greater. This relationship also follows with respect to the ratio of depth d of rib R to thickness b of rib R. Furthermore, dimension c of ejector boss P and boss Q are kept small, e.g., not more than four times thickness t of plate 100. Likewise, boss dimension e is not more than 10 times thickness t of plate 100, e.g., in a range between 4–7 depending upon the section of plate 100 measured.

As seen by FIGS. 6 and 7 relatively sharp fillet radii f exists between rib R and plate 100 and boss Q and plate 100. Further, the draft angle is about 1° or less. (Draft angle is defined as the angle shown in FIGS. 6 and 7, i.e., an angle at which a boss or rib tapers from a line normal to the plate at the boss or rib intersection therewith.) Rib R has thickness b about equal, or even more preferably, substantially less than plate thickness t. Thickness of rib R, for example, may vary from 10–50% less than t depending upon rib location and depending upon thickness of the section of plate 100 measured.

While relatively thin, relatively deep ribs and bosses, as described with reference to FIGS. 6 and 7, illustrate preferred dimensional characteristics, panels of this invention are not necessarily limited to such characteristics. Rather, for example, thicker and less deep ribs and bosses as well as greate fillet radii will tend to give wider (as measured on the outer surface of plate 100) sink. Such wide sink may prove in certain circumstances, e.g., ribs that follow contours, a desired consequence or so hidden from view as to make no appreciable difference.

The embodiment of FIGS. 1–7 particularly relate to, as mentioned, a hood or engine compartment closure panel of a van. In another embodiment, the panel has front to rear dimension greater than side-to-side dimension, i.e., the length of rib 206 exceeds that of rib 204. In this embodiment, center-corner and corner center rib patterns 220 and 218, respectively, of FIG. 2 are replaced by rib patterns that extend diagonally from right and left rearward corner areas to respective left and right forward corner areas and form an X-shaped pattern thereby. This X-shaped pattern intersects forward of a member weakening pattern similar to that illustrated by FIGS. 2–6. In still another embodiment, the panel is decklid and has panel reinforcements and weakening as illustrated in FIGS. 2–6 but fitted to the geometry of the decklid.

A procedure for preparation of panel 10 or other such panels is as follows. The procedure uses a standard, commercially available compression molding press. The mold press has mold members that have temperature control means. These control means maintain a molding temperature, between about 275°–325° F., more preferably 280°–310° F., by usual means.

When closed, the mold members provide a cavity conforming to desired panel configuration, e.g., panel 10. One of the mold members has chambers that fill during molding to form ribs, bosses, etc. The other mold member conforms to a desired outer surface for the panel. An operator or device places molding compound between the mold members. The molding compound is in layers positioned one atop another. The so positioned layers provide a charge pattern that has length and width much larger than its thickness. Each layer may be as little as 1/16 inch or less thick. Layers with larger thicknesses, e.g., ¼ inch or more, may also be used.

Normally, there will be at least two layers of molding compound, more preferably at least three. FIG. 8 shows a charge pattern comprising four layers. As in FIG. 8, at least layers 1 and 2 (comprising relatively short and relatively long reinforcing fibers respectively) will be of about equally large dimensions (i.e., length and width). When the layers have approximately equal lengths and widths, upward or downward flow between layers is less likely.

As mentioned, the layers comprise fiber reinforcement. Each layer also preferably comprises a low shrink resin, which is more preferably a combination of thermosetting resin thermoplastic resin, such as a polyester and an acrylic resin, respectively. The thermoplastic resin reduces shrink of the thermosetting resin during cure. A typical preferred resin formulation will have about 20–40 parts thermoplastic resin and about 80–60 parts thermosetting resin including monomers. Molding compound or resin containing thermoplastic resin is commonly referred to as "low profile" molding compound or resin.

Production of molding compound as above described is well known. See, for example, U.S. Pat. No. 3,903,343. Typically, such compound is referred to as "sheet molding compound." Since sheet molding compound including resins, fibers, fillers, additives etc. is well known and widely available, there is no need for extension description of its preparation. Briefly, however, sheet molding compound is made in one process by dropping fiber (e.g., chopped glass) onto a moving bed of formulated resin. The formulated resin has been previously spread on a thin sheet of plastic (e.g., polyethylene) which serves as a backing. After fiber has been dropped onto the resin and an admixture made thereby, a second resin coated plastic sheet covers the fiber and resin admixture. Thus, the first and second resin coated plastic sheets have sandwiched between them two layers of formulated resin and one layer of fiber. A sandwich so made may be aged for a period of time.

The sandwich may be thereafter cut into sections. Upon removal of the plastic sheets, a charge pattern, as illustrated in FIG. 8 may be made. The charge pattern of FIG. 8 has three layers (shown as 2, 3 and 4) of one molding compound (comprising thermosetting resin and relatively long fibers) and one layer (shown as 1) of a different molding compound (comprising thermosetting resin and relatively short fibers). Each layer has approximately equal weights of fiber reinforcement and is preferably made from the same resin formulation. The resin formulation has a paste viscosity between 5–40 million centipoise at 25°, more preferably between about 20–30 million centipoise at 25° C. (Paste viscosity refers to viscosity of sheet molding compound without glass or other fiber reinforcement.) Paste viscosity between about 20–30 million advantageously reduces porosity of the cured panel.

Layers 2, 3 and 4 have chopped glass fiber that has an average length at least about two (more preferably at least about three) times the average length of the chopped fiber in layer 1. The volume of layers 2, 3 and 4 bears a ratio to the volume of 1 that is substantially equal (within about 25%, more preferably 15%) to the ratio of plate 100 volume to rib and boss volume.

Fibers lengths that average between 1–3 inches are especially preferred for the relatively long fibers. Fiber lengths that average between about ¼–¾ inches are especially preferred for the relatively short fibers. Fibers that average less than ¼ inch may impart less than optimum desired strength to the reinforcing members.

When the molding compound is in position between the mold members, an upper mold member preferably closes to cause flow of the molding compound into the cavity. The relatively short fibers preferentially flow into the chambers of a bottom mold member. At the end of the molding cycle, the relatively long fibers have a long axis that lies generally in the plane of plate 100. The short fibers, having less resistance to flow, lie more in a plane of the reinforcing members of panel 10. The greate the flow, the more perpendicular to the plate the short fibers become. The relative proportion of relatively long fibers to relatively short fibers is preferably such that the relatively long fibers bridge across the top of chambers with the relatively short fibers generally entering the chambers.

The mold members preferably close slowly, e.g., 3–10 inches per minute, more preferably 4–8 inches per minute. This rate is based upon closure of the mold members after first contact of the molding compound by the mold members. The molding press exerts a pressure between about 400–1600 psi (more preferably 500–1400 psi) on the molding compound during closure of the mold members. This pressure causes the molding compound to flow into desired configuration for the panel e.g., panel 10.

When the mold members close upon each other, the chambers preferaby contain substantially all of the relatively short fibers. The remainder of the cavity contains substantially all of the relatively long fibers. In this way, discontinuities in flow between long and short fibers is kept as low as possible below the long fibers and the long fibers act as a bridge across areas of potential sink.

After closure of the mold members, pressure preferably is maintained in a relatively high range for a period of time, e.g., 5–80 seconds. Longer times, e.g., about 30–60 seconds within this period tend to reduce "laking", a term referring to undesired microvoids within the surface of a cured panel. Shorter times (e.g., about 10–40 seconds) within this period, however, tend to reduce sink more. A period between about 15–50 seconds normally enables optimum surface quality of a cured panel.

A reduction in pressure further significantly enhances surface quality of the cured panel. The pressure is reduced to a subsequent pressure of between about 100–800 psi, more preferably between about 150–500 psi. The ratio of a maximum in the high pressure range to a minimum in the low pressure range may vary, for example, between about 9:1 to 3:2, more preferably between 5:1 to 2:1. A pressure reduction during molding is particularly useful with "low profile" resins that contain thermoplastic resin.

After pressure reduction, the panel cures at least substantially in the mold. A substantial cure occurs after a period of less than about four minutes preferably about 1–3 minutes. Thinner plate panels require a lesser period for cure.

EXAMPLE 1

The following procedures are utilized to provide panel 10 in accordance with it depicted in FIGS. 1–7. The charge pattern is depicted in FIG. 8. Layer 1 has ½ inch chopped glass fiber; layer 2, 3 and 4 have 2 inch chopped glass fiber. The layers are about 60×13×⅛ inches and positoned on the lower mold member equally on either side of center line 200, but slightly rearward, i.e., the lower corner is on rib Y.

The press is a 1600 ton press. Dimensions (in inches) of panel 10 with reference to FIGS. 6 and 7 are as follows: a=0.06; b=0.08; c=0.25 (ejector pin boss P), 0.24 (Boss Q); d=0.70 (Rib R), 0.70–1.3 (Boss Q); e=0.63; t=0.09–0.15.

The sheet molding compound (paste viscosity about 25 million centipose at 25° C.) has a formulation as follows:

| Ingredient | Parts By Weight |
| --- | --- |
| RS 50393* | 100 |
| t-butyl (perbenzoate) (TBPB) | 1.5 |
| Calcium Carbonate (Snow Flake) | 200 |
| RS59025* | 17.1 |
| Glass (Owens Corning Fiberglass 951) | 123.9 |

*RS 50393 is a polyester-styrene-thermoplastic resin (low profile) available from PPG
RS 59025 is a zinc stearate and magnesium oxide, pigment combination in carrier resin available from PPG.
Snow Flake (R) is available from Thompson Weinman & Co.

The molding compound covers about 50% of the lower mold half. Mold close rate is about 5–6 inches per minute. A pressure of 950 psi after part fillout is maintained for 40 seconds. The pressure is then hydraulically reduced to 400 psi. Cure time is 2 minutes.

The plate has nearly all the long fibers; the other portion of the panel has nearly all short fibers.

EXAMPLE 2

The procedures of Example 1 are followed except that the resin formulation is:

| Ingredient | Parts By Weight |
| --- | --- |
| RS 50340* | |
| TBPB | 1 |
| Calcium Carbonate (Snow Flake) | 200 |
| Zinc Stearate | 2.0 |
| RS 59003* | 8.5 |
| Glass - OCF 951 | 121.3 |

*RS 50340 is a polyester-styrene thermoplastic resin (low profile) available from PPG; RS 59003 is a magnesium oxide thicker, pigment combination in carrier resin available from PPG.

The results are comparable but less satisfactory relative to those of Example 1 with respect to surface finish.

A fiber reinforced panel of this invention has particular advantage, especially with respect to molding such as by compression molding, when the panel comprises a plate having a smooth outer surface and an inner surface bearing integrally molded reinforcing members, the plate being reinforced substantially by relatively long fibers and the reinforcing members being reinforced substantially by relatively short fibers, the ratio of average lengths of the relatively long to relatively short fibers being at least 2:1. The long axis of the relatively long fibers lie in a plane of the plate and the long axis of the relatively short fibers lie in a plane of the reinforcing members.

What is claimed is:

1. A plastic closure plane which buckles forward of its rearward edge across its width on an impact that is at its forward edge, said panel comprising a plate having a smooth, outer surface and an inner surface bearing integrally formed reinforcing members, said inner surface and reinforcing members having definition comprising:
    A. opposing first and second rib patterns comprising ribs diagonally extending sufficiently across said inner surface so as to intersect one another between said forward and rearward edges and provide torsional rigidity to said panel;
    B. a medial rib pattern comprising a rib that extends along a width of said inner surface;

C. a rearward rib pattern comprising a rib that extends from said medial rib pattern to said rearward edge;
D. a panel weakening pattern that enables buckling of said panel along a line adjacent to said medial rib pattern and comprising:
  1. reduced thickness of said plate forward of said medial rib pattern;
  2. discontinuities in ribs of said first and second rib patterns at said medial rib pattern.

2. A closure panel in accordance with claim 1 wherein said ribs diagonally extending sufficiently across said inner surface so as to intersect one another between said forward and rearward edges intersect forward of said medial rib pattern.

3. A closure panel in accordance with claims 1 or 2 wherein said reduced thickness of said plate comprises a continuous groove in said plate.

4. A closure panel in accordance with claims 1 or 2 wherein said reduced thickness of said plate comprises a discontinuous groove in said plate.

5. A closure panel in accordance with claims 1 or 2 wherein said plates comprise relatively long fiber and said reinfocing members comprise relatively short fibers.

6. A plastic engine compartment closure panel which buckles forward of its rearward edge across its width on an impact at its forward edge, said panel comprising a plate having a smooth, outer surface and an inner surface bearing integrally formed reinforcing members, said inner surface and reinforcing members having definition comprising:
  A. first and second rib patterns positioned with respect to one another so as to have ribs that extend from right and left sides to intersect one another between said forward and rearward edges;
  B. a medial rib pattern comprising a rib that extends across said inner surface rearward of intersection of ribs of said first and second rib patterns;
  c. a rearward rib pattern comprising a rib that extends between said medial rib pattern and said rearward edge;
  D. a panel weakening pattern that enables buckling of said panel along a line forward of said medial rib pattern and comprising:
    1. a groove extending along said medial rib pattern and
    2. discontinuities of ribs of said first and second rib patterns.

7. A closure panel in accordance with a first portion of claim 6, wherein a first portion of said ribs of said first and second rib patterns extend from right and left rearward sides to a center latch area and a second portion of said first and second rib patterns extend from right and left forward side to a center rearward area.

8. A closure panel in accordance with claim 7, wherein said groove extending along said medial rib is discontinuous.

9. A closure panel in accordance with claims 6 or 8 wherein said groove extending along said medial rib is continuous.

10. A plastic engine compartment closure panel which buckles forward of its rearward edge across its width on an impact that is at its leading forward edge and said panel comprising a plate having a smooth, outer surface and an inner surface bearing integrally formed reinforcing member; said inner surface and reinforcing member having definition comprising:
  A. a first V-shaped rib pattern comprising reinforcing ribs extending diagonally from a center, rearward section to each corner portion of said forward leading edge;
  B. a second V-shaped rib pattern inverted with respect to said V-shaped pattern, said second V-shaped pattern comprising reinforcing ribs extending diagonally from a center, forward section to each corner portion of said rearward edge;
  C. a medial rib pattern comprising a reinforcing rib that extends across the width of said member rearward of an intersection of ribs of said first and second V-shaped rib patterns;
  D. a rearward rib pattern comprising reinforcing ribs that extend between said medial rib pattern and said rearward edge;
  E. a panel weakening pattern that enables buckling of said panel along a line forward of said medial rib pattern and comprising:
    1. a groove extending along and forward of said medial rib pattern and
    2. interruptions to ribs of said first and second V-shaped rib patterns.

11. A panel in accordance with claim 10, wherein said plate comprises relatively long fibers and said reinforcing members comprise relatively short fibers.

12. A panel in accordance with claim 10, wherein said groove is continuous.

13. A panel in accordance with claim 10, wherein said groove is discontinuous.

14. A panel in accordance with claims 11 or 13 wherein said groove is interrupted by a first rib of each of said first and second V-shaped rib patterns.

15. A panel in accordance with claim 14 wherein a second rib of said first and second rib patterns do not interrupt said groove.

16. A panel in accordance with claim 15 wherein said second rib of said first and second rib patterns communicates with said medial rib.

17. A panel in accordance with claim 16, wherein said first and second ribs of said first and second rib patterns have a depth that is less at a location nearest said groove.

18. A panel in accordance with claim 17 wherein, said first and second ribs have a depth that decreases near said groove proportional to their respective distance from said groove.

19. A plastic engine compartment closure panel which buckles forward of its rearward edge across its width on an impact that is at its leading forward edge and said panel comprising a plate having a smooth, outer surface and an inner surface bearing integrally formed reinforcing member; said inner surface and reinforcing member having definition comprising:
  A. a first V-shaped rib pattern comprising reinforcing ribs extending diagonally from a center, rearward section to each corner portion of said forward leading edge;
  B. a second V-shaped rib pattern inverted with respect to said V-shaped pattern, said second V-shaped pattern comprising reinforcing ribs extending diagonally from a center, forward section to each corner portion of said rearward edge;
  C. a medial rib pattern comprising a reinforcing rib that extends across the width of said member rearward of an intersection of ribs of said first and second V-shaped rib patterns;

D. a rearward rib pattern comprising reinforcing ribs that extend between said medial rib pattern and said rearward edge;
E. a panel weakening pattern that enables buckling of said panel along a line forward of said medial rib pattern and comprising:
 1. a groove extending along and forward of said medial rib pattern,
 2. interruptions to ribs of said first and second V-shaped rib patterns at a first rib of said first and second V-shaped rib patterns,
 3. interruptions to said groove at a second rib of said first and second V-shaped rib patterns.

20. A panel in accordance with claim 19 wherein said plate comprises relatively long fibers and said reinforcing members comprise relatively short fibers.

21. A panel in accordance with claims 19 or 20, wherein said second rib of said first and second rib patterns communicates with said medial rib.

22. A panel in accordance with claim 21 wherein said first and second ribs of said first and second rib patterns have a depth that is less at a location nearest said groove.

23. A panel in accordance with claim 17 wherein said first and second ribs have a depth that decreases near said groove proportional to their respective distance from said groove.

* * * * *